Aug. 15, 1961  F. S. DIXON  2,995,854
FISH ALARM DEVICE
Filed Jan. 27, 1959

INVENTOR.
FERNIE S. DIXON
BY
Mead, Browne, Schuyler & Beveridge
ATTORNEYS

United States Patent Office 2,995,854
Patented Aug. 15, 1961

2,995,854
FISH ALARM DEVICE
Fernie S. Dixon, % Dixon Boat Works, 8861 Midnight Pass, Sarasota, Fla.; Lina J. Dixon, administratrix of said Fernie S. Dixon, deceased
Filed Jan. 27, 1959, Ser. No. 789,392
3 Claims. (Cl. 43—17)

This invention relates to a fish alarm and more particularly to a fish alarm attachment which may be removably secured to a fishing rod, a boat, a dock or a like support, and which is activated by a minimum pull on a fishing line associated therewith.

While fishing is a popular pastime, it is safe to say that a greater part of a fisherman's time is spent waiting for a fish to take the offered bait than in reeling in the catch. Since one does not know how long it will be from the time the bait enters the water until it is snatched by a fish, the fisherman must keep a constant watch on his line. The problem becomes more acute if, for example, the fisherman is using two or more lines at different parts of a boat. Also, since the lines cannot be left unattended more than a few moments, the fisherman is prevented from attending to his boat or doing other chores while waiting for a strike.

While fish alarms have been known, most are of the type which are structurally integral with a fishing reel, thus necessitating the purchase of a special reel in order to obtain the advantage of the alarm. Other known alarms are complex, bulky, and cannot be quickly and easily secured to and removed from a fishing rod, the side of a boat, or other support.

Accordingly, it is an object of this invention to provide a fish alarm attachment which obviates the disadvantages of existing fish alarms.

Another object of this invention is to provide a fish alarm which may quickly and easily be attached to and removed from a fishing rod, the side of a boat, or like support, and which may be easily engaged or disengaged with a loop of the fishing line.

A further object of this invention is to provide a fish alarm which may be used with any fish line, from light spinning tackle to heavy trolling and hand lines, and which quickly responds to a minimum of pressure or pull on the fishing line which is associated therewith.

In attaining the objects of this invention one feature resides in providing a housing with alarm means therein activated by a pull on a fishing line and means on the exterior of the housing for removably securing the housing to a fishing rod, the side of a boat or like supports.

Another feature resides in rotatably mounting a spool, adapted to receive a loop of a fishing line, on the outside of the housing which spool is linked with the alarm therein so that a pull of the fish line rotates the spool and activates the alarm mechanism.

Other objects, features and advantages of this invention will become obvious from the following description thereof taken in conjunction with the drawing wherein.

Figure 1:
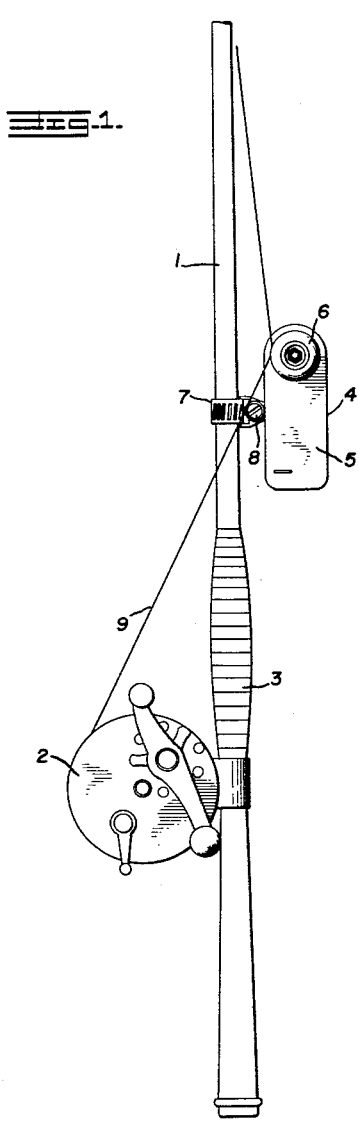
FIG. 1 is an elevational view of a fishing rod having a reel and an embodiment of the fish alarm of the invention secured thereto.

As may be seen from FIG. 1, a fishing pole or rod 1 has the usual fishing reel 2 attached to it adjacent the handle 3. Also secured to the rod 1 is a fish alarm 4 including a housing 5 and a spool 6 rotatably mounted on an outer surface of the housing 5. While the housing is illustrated in FIG. 1 as being secured to the fishing rod by an annular ring 7 which is slipped over the smaller end of the fishing rod and the diameter of the ring is reduced by rotating the screw 8, which provides relative movement between the overlapped ends of the ring (not shown) to securely lock the annular ring 7 to the rod 1, it is to be understood that other securing means will be apparent to those in the art and may be substituted therefor. Extending from the reel 2 and looped about the spool 6 before passing upwardly toward the end of the fishing rod 1 is a fishing line 9.

Figure 2:
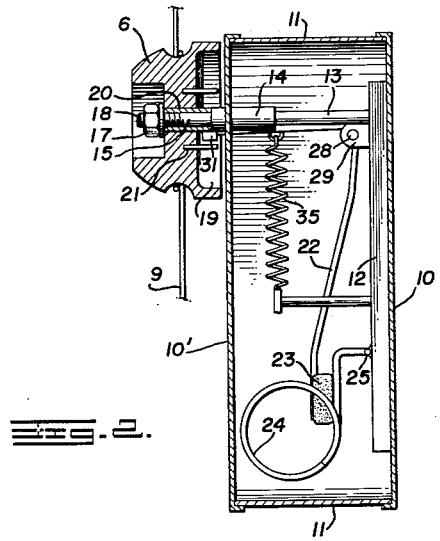
FIG. 2 is a sectional view of one embodiment of the fish alarm of this invention.

As may be seen from the embodiment illustrated in FIG. 2, the housing 5 is formed by a pair of flanged, spaced end walls 10, 10' which are secured along their flanges to a continuous side wall 11.

Figure 4:
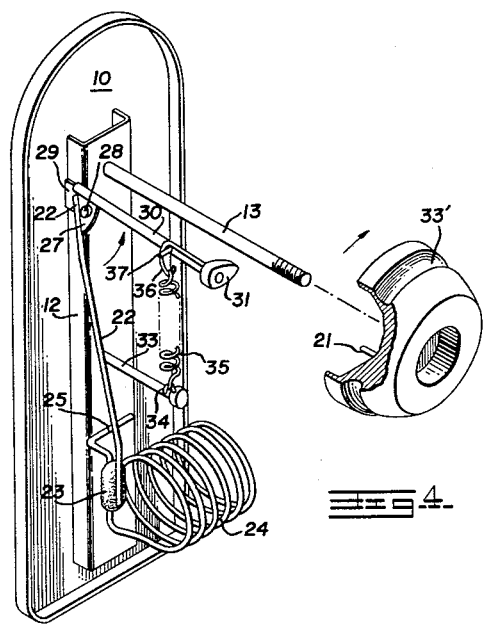
FIG. 4 is a perspective view of the alarm mechanism of the embodiment of FIG. 2.

The alarm mechanism is illustrated in FIGS. 2 and 4 and includes an elongated vertically disposed base plate 12 attached to the inner surface of end wall 10 and having a shaft 13 rigidly secured thereto at its uppermost end, which shaft extends laterally through a sleeve 14 mounted in end wall 10' and through the bearing 15 centrally located in the spool 6 so that the spool is rotatable about the shaft 13 and is held thereto by the nut 17 which threadingly engages the outer end 18 of the shaft 13.

Rigidly affixed within a recess 19 and diametrically disposed on either side of the axial bore 20 and bearing 15 of spool 6 are a pair of axially extending pins 21.

Pivotally mounted on the base plate 12 for movement in an arc within a plane substantially perpendicular to the base plate 12 and end wall 10 is an arm 22 having a clapper 23 secured at its lower end, which clapper is normally maintained in contact with a portion of the coiled spring alarm 24. The alarm 24 is spaced from the base plate 12 and held in this position by an end 25 of the coiled spring being secured, as by welding, to the base plate 12. That portion of the alarm 24 which is in contact with the clapper 23 is also spaced from the base plate 12.

Figure 3:
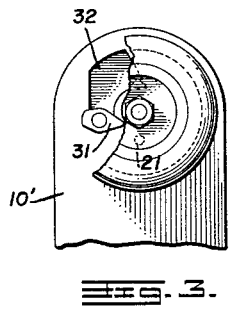
FIG. 3 is an elevational front view of the upper portion of the invention of FIG. 2 with parts cut away to disclose further structural features.

At the upper end of arm 22 is secured a triangular plate 27 which is pivotally mounted for rotation about pin 28 which in turn is mounted on member 29 affixed to the base plate 12. Also attached to the triangular plate 27 and thus pivotable therewith is a laterally extending rod 30 which is spaced from and substantially parallel to the shaft 13 but is shorter in length than the shaft. Pivotally mounted on the outer end of the rod 30 is a tapered trigger 31. As may be seen from FIG. 3, the length of the rod 30 is sufficient to enable the trigger 31 to extend beyond the wall 10' of the housing 5 through the opening 32.

Attached to the base plate 12 at approximately its mid point is a rod 33 which also extends laterally from the base plate and is substantially parallel to the rod 30 and shaft 13. Secured to the outer end of rod 33 is a hook 34 which is engaged by one end of a flexible spring 35 having its other end in engagement with hook 36 disposed about pin 37 projecting laterally from the rod 30. The straight leg 36' of hook 36 extends substantially parallel to the outer end of rod 30 and is attached to the base of the trigger 31.

In operation, a pull on the fishing line 9 coming from the direction of the small end of the fishing rod 1 will cause the spool 6 as seen in FIGURE 1, to rotate clockwise (in the direction of the arrow in FIG. 4) because of the looping of line 9 within groove 33' of the spool. As the spool turns clockwise, pin 21 engages the bottom tapered surface of the trigger 31. Since the trigger is prevented from rotating counterclockwise about rod 30 because of the engagement of hook 36 with pin 37, trigger 31 can only move upwardly. This upward movement is transmitted to the rod 30 and triangular plate 27 which pivots about pin 28 causing arm 22 and clapper 23 to move away from that portion of the spring alarm 24 against which the clapper 23 usually rests when the alarm is inoperative. Continued clockwise rotation of the spool causes the pin 21 to clear the tapered end of the trigger 31, and trigger 31 and rod 30 which had been moved upwardly against the force of the spring 35 are now quickly pulled downwardly by the contraction of the spring and the clapper 23 strikes the spring alarm 24 to make an audible sound.

Figure 5:
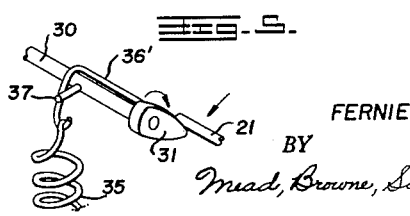
FIG. 5 is an enlarged view of the trigger mechanism for the alarm of FIG. 4.

Any counterclockwise rotation of the spool 6 which occurs when the operator is reeling in the line, will cause trigger 31 to pivot in a clockwise direction about rod 30 as it is engaged by pin 21 (see FIG. 5) thus merely causing an expansion of the spring 35 but no movement of the arm 22 or clapper 23. Thus, it is evident that a pull on the line 9 causes clockwise movement of the rotatable spool 6, and alarm 24 will be sounded twice for each rotation of the spool, since the trigger 31 will be engaged by the two diametrically opposed pins 21. Upon hearing the alarm, the fisherman may begin to reel in the fish without having the alarm sound because of the rotation of the spool. As explained above, the counterclockwise movement of the spool 6 and the resulting striking of the trigger 31 by pins 21 will merely cause an extension of the flexible spring 35, but no movement will be transmitted to the clapper 23. Thus, the fisherman need not waste time disconnecting his alarm before reeling in his fish, even though all that is necessary is to merely remove the loop of the line 9 from the groove 33' of spool 6.

Having fully described the invention, what is claimed is:

1. A fish alarm for use with a fishing line comprising a housing, alarm means including a clapper within said housing, a spool rotatably mounted on the exterior of said housing for receiving a loop of said fishing line thereabout, a trigger linked to said clapper for moving said clapper relative to said alarm means, said trigger being disposed adjacent said spool on the exterior of said housing and pivotable relative to said spool, and a pin on said spool for intermittently engaging and pivoting said trigger which simultaneously moves said clapper into intermittent engagement with said alarm, whereby a pull on said fishing lines rotates said spool and activates said alarm.

2. The fish alarm as defined in claim 1 wherein said spool has a recess therein on the surface adjacent said housing, said pin is mounted within the recess, and said trigger is disposed within said recess.

3. A fish alarm for use with a fishing line comprising a housing, alarm means including a clapper within said housing, a spool rotatably mounted on the exterior of said housing for receiving a loop of a fishing line thereabout, a rod mounted within said housing for movement in a direction away from the axis of said spool and linked to said clapper for pivoting said clapper away from said alarm, means on said rod resiliently resisting movement of said rod and continuously urging said clapper into contact with said alarm, a trigger mounted on said rod for rotation about said rod in one direction, means on said rod for preventing the rotation of said trigger in the other direction about said rod, said trigger disposed adjacent said spool, and means on said spool for intermittently engaging said trigger, said alarm being activated only when said trigger is intermittently engaged in its non-rotatable direction to simultaneously move said rod and pivot said clapper away from said alarm.

References Cited in the file of this patent

UNITED STATES PATENTS

| | | |
|---|---|---|
| 253,090 | Ohaver | Jan. 31, 1882 |
| 827,972 | Grignon | Aug. 7, 1906 |
| 1,132,158 | Brewer | Mar. 16, 1915 |
| 1,357,915 | Treanor | Nov. 2, 1920 |